United States Patent [19]
Niskanen

[11] Patent Number: 5,860,903
[45] Date of Patent: *Jan. 19, 1999

[54] METHOD AND APPARATUS FOR SUPPORTING A ROLL MANTLE

[75] Inventor: Juhani Niskanen, Oulunsalo, Finland

[73] Assignee: Valmet Corporation, Helsinki, Finland

[ * ] Notice: The term of this patent shall not extend beyond the expiration date of Pat. No. 5,509,883.

[21] Appl. No.: 959,349

[22] Filed: Oct. 28, 1997

Related U.S. Application Data

[62] Division of Ser. No. 528,766, Sep. 15, 1995, Pat. No. 5,743,839.

[30] Foreign Application Priority Data

Sep. 15, 1994 [FI] Finland ................................... 944272

[51] Int. Cl.⁶ .................................................. B23P 15/00
[52] U.S. Cl. ................................................ 492/20; 492/7
[58] Field of Search .................................. 492/7, 20, 21, 492/5, 6; 162/358.1, 358.3; 29/895.3; 100/35, 162 R, 170

[56] References Cited

U.S. PATENT DOCUMENTS

| | | | |
|---|---|---|---|
| 4,562,802 | 1/1986 | Groeger | 123/200 |
| 4,563,245 | 1/1986 | Wanks et al. | 162/358 |
| 4,584,059 | 4/1986 | Schiel et al. | 162/361 |
| 4,625,637 | 12/1986 | Pav et al. | 100/47 |
| 4,707,222 | 11/1987 | Mu Liner et al. | 162/205 |
| 4,757,585 | 7/1988 | Niskanen | 29/116.2 |
| 4,793,250 | 12/1988 | Niskanen | 100/35 |
| 4,852,229 | 8/1989 | Crouse | 29/116.2 |
| 4,864,703 | 9/1989 | Biondetti et al. | 29/116.1 |
| 5,060,357 | 10/1991 | Roerig et al. | 29/113.2 |
| 5,111,563 | 5/1992 | Brown et al. | 29/116.2 |
| 5,223,100 | 6/1993 | Brown et al. | 29/116.2 |
| 5,286,245 | 2/1994 | Schiel | 492/7 |
| 5,368,697 | 11/1994 | Steiner et al. | 162/360.2 |
| 5,509,883 | 4/1996 | Niskanen et al. | 492/20 |
| 5,566,451 | 10/1996 | Niskanen et al. | 29/895.3 |

*Primary Examiner*—Larry I. Schwartz
*Assistant Examiner*—Marc W. Butler
*Attorney, Agent, or Firm*—Steinberg & Raskin, P.C

[57] ABSTRACT

A method and apparatus for supporting a roll mantle of a roll for a paper machine or equivalent in a lateral direction, in particular in the direction transverse to a principal loading direction, such as the nip plane. The roll mantle is rotatingly supported on a stationary roll axle, e.g., by support and loading members, and is displaceable in relation to the axle substantially in the principal loading direction. The roll mantle is also supported on the roll axle radially by glide bearing elements acting in opposite radial directions so that, when the roll mantle is displaced in the principal loading direction, the movement of the roll mantle is guided to take place along a predetermined path.

5 Claims, 7 Drawing Sheets

METHOD AND APPARATUS FOR SUPPORTING A ROLL MANTLE

This application is a divisional of U.S. patent application Ser. No. 08/528,766 filed Sep. 15, 1995, now U.S. Pat. No. 5,743,839.

FIELD OF THE INVENTION

The present invention relates to a method for supporting a roll mantle of a roll for a paper machine or equivalent in the lateral direction, in particular in the direction transverse to the principal loading direction, such as the nip plane. In the method, the roll mantle is rotatably supported on a stationary roll axle and is displaceable in relation to the roll axle substantially in the principal loading direction.

Further, the invention relates to an apparatus for supporting the roll mantle of a roll for a paper machine or equivalent in the lateral direction, in particular in the direction transverse to the principal loading direction, such as the nip plane, while the roll mantle is rotatably supported and is displaceable in the principal loading direction on a stationary roll axle radially by means of glide bearing elements acting in opposite directions in the lateral direction and supported on the inner face of the roll mantle.

BACKGROUND OF THE INVENTION

Ordinarily, tubular rolls of paper machines are mounted or journalled from the ends of the roll mantle by means of rolling-contact bearings on the roll axle. Such a traditional mode of journalling has its advantages, for example, the fact that the Journalling can be accomplished quite simply and so far its cost has been considered to be relatively reasonable. However, this traditional mode of journalling in which the roll mantle is journalled by its ends in a fixed manner on the axle, is not suitable for all applications in paper machines. Indeed, in quite a number of situations, e.g., in variable-crown rolls which are in nip contact with a back-up roll, the roll mantle must be able to move in the radial direction in relation to the roll axle, which is hindered by the traditional end-journalling method. In addition to the fact that, by means of the crown variation means in a variable-crown roll, attempts are made to shape the roll mantle in the desired manner in particular for regulation of, the profile of linear load, the roll ends must also be able to move in the radial direction in relation to the roll axle in order that the profile of linear load may also be controlled in the end areas of the roll. Besides the properties of profile regulation in the end areas of the roll, regulation of the loading in the end areas of the roll also affects the control of the temperatures in the end areas.

For this reason, rolls have also been developed in which the entire roll mantle can move in the direction of the load radially in relation to the roll axle. One such roll is described in the assignee's European Patent No. 0 332 594 of earlier date, in which the end bearings of a variable-crown roll are not mounted directly on the central axle of the roll. Rather, the bearings are arranged on separate annular parts which can move radially in relation to the roll axle. The variable-crown roll in accordance with this publication is a nip roll, and the radial movement of the roll mantle is restricted to the direction of the nip plane. The movement has been accomplished so that, between the annular parts and the roll axle, hydraulic power units are arranged. These hydraulic power units shift the end bearings by means of hydraulic pressure medium effective therein relative to the nip, i.e., toward the nip or away from the nip. A principal objective of this embodiment is the opening and closing the nip. There are also a great number of other rolls of Similar type which produce a substantially similar operation, accomplished with a somewhat different technique.

The use of rolling-contact bearings in a roll also produces considerable drawbacks and/or problems for the manufacture and operation of a roll. It is one particular drawback that the rolling-contact bearings require respective machining of the roll mantle. The wear of the bearings may also produce problems and, further, the rolling-contact bearings impose their limitations in respect of the fluid used in the roll. For example, the following properties can be considered to be drawbacks of the traditional mode of journalling.

1. Limitations of speed: Even at present, the speeds of rotation of the rolls exceed the highest permitted speeds specified by bearing manufacturers.

2. Accuracy of rotation: Further improvement of the accuracy of rotation of an assembled roll with the prior art technology is very difficult. In a traditional roll, even if all the components (bearings, bearing housings, outer face of the mantle) are machined as precisely as possible, the errors are summed up in an assembled roll.

The arrangement of the journalling of the roll mantle by means of glide bearings is also known in the prior art. Such rolls with glide bearings are described, for example, in U.S. Pat. Nos. 5,060,357 and 5,111,563. In the roll in accordance with U.S. Pat. No. 5,060,357, the roll mantle is provided with rolling-contact bearings arranged in the areas of its end pieces, which bearings are arranged on separate annular parts of a type similar to those mentioned in the above-referenced EP Patent No. 0 332 594. The roll is meant to be a nip roll, and its roll mantle can move in the direction of the nip plane in relation to the roll axle, for example, for the purpose of opening and closing the nip. The lateral support of the roll mantle, i.e., the support in the direction transverse to the nip plane, is arranged by means of a complicated construction of glide bearings, by whose means the movement of the roll mantle can be made to take place exactly in the direction of the nip plane. One drawback of this construction is expressly the complexity of the construction, among other things with a number of glide faces and articulated joint arrangements, for which reason its reliability in operation, the controllability, and the dependability of the construction are not considered very good.

In U.S. Pat. No. 5,111,563, an arrangement of support of a roll with glide bearings in the lateral direction is described, which arrangement is simpler than the construction of U.S. Pat. No. 5,060,357 mentioned earlier. In this arrangement, the arrangement of the glide bearings in the lateral direction has, however, been accomplished by means of an arrangement of articulated joints by whose means linear movement of the roll mantle in the direction of the nip plane cannot be produced.

In particular in nip rolls, it is important to be able to produce a linear movement, for example, for the following reasons. If the diameter of the rolls (either the roll with glide bearings or the back-up roll) is changed, the nip point is shifted if the roll mantle does not move along a linear path. If the axle of a variable-crown roll is placed at different levels at the opposite ends, without a linear movement, the rolls that form the nip are placed crosswise. This again produces axial forces, wear of the bearings, felts, etc, changes the structure of the felt, produces picking of the felt, etc., all of which factors have a substantially deteriorating effect on the runnability and on the quality of the paper. A further considerable problem is the passing of so-called fiber "clods" into the nip. If the roll mantle does not perform a linear movement, there is the risk that the force produced by the "clods" has an effect that opens the nip, as a result of which the construction may be broken.

OBJECTS AND SUMMARY OF THE INVENTION

An object of the present invention is to provide a method and apparatus of a novel type for supporting the roll mantle of a roll intended for use in a paper machine or equivalent in the lateral direction.

It is another object of the present invention is to provide a method and apparatus by means of which some of the drawbacks involved in the prior art constructions and methods are avoided and by means of which, at the same time, a substantial improvement is achieved over the prior art constructions and methods.

In view of achieving the objects stated above, and others, in the method in accordance with the invention, the roll mantle is supported on the roll axle radially by means of glide bearing elements acting in opposite directions in the lateral direction so that when the roll mantle is displaced in the principal loading direction, the movement of the roll mantle is guided to take place along a desired curve.

In the apparatus in accordance with the invention, glide bearing elements are arranged in a roll to support a roll mantle arranged about the roll so that the movement of the roll mantle in the principal loading direction is guided to take place along a desired curve.

By means of the invention, a number of remarkable advantages are obtained over the prior art constructions, an important one of which is that the roll mantle can be made to perform a linear movement in its principal loading direction, in particular in the direction of the nip plane. Owing to this linear movement, in particular when rolls that form a nip are concerned, the nip point remains unchanged even if the diameters of the rolls that form the nip were changed. It is a further advantage of the invention that the rolls that form the nip remain parallel to one another and thus do not become placed crosswise when the roll mantle moves in the direction of the nip plane even if the roll axle were placed at different levels at opposite ends.

Thus, briefly, in the method for rotatingly supporting a roll mantle on a stationary roll axle in a paper machine in accordance with the invention, loading means are arranged on the roll axle for supporting and loading the roll mantle in a principal loading direction whereby the roll mantle is movable in relation to the roll axle at least in the principal loading direction. At least one pair of glide bearing elements are arranged to support the roll mantle in opposite radial directions substantially transverse to the principal loading direction and act upon the roll mantle under hydraulic pressure provided by a pressure medium. Movement of the roll mantle is guided along a desired path, e.g., along a substantially linear path in the principal loading direction, upon movement of the roll mantle in the principal loading direction. Moreover, the flow and the pressure of the pressure medium to each of the glide bearing elements is regulated relative to the movement of the roll mantle by, e.g., supplying pressure medium to a valve having a first and second outlet leading to a respective first and second glide bearing element, arranging a movable slide in the valve to selectively control opening and closing of the first and second outlets relative to one another, and coupling the slide to the first glide bearing element to control movement of the slide relative to the movement of the roll mantle as conveyed through the movement of the first glide bearing element in engagement with the roll mantle. Also, it is possible to guide the glide bearing elements as a function of the movement of the roll mantle such that, when the roll mantle is moved in the principal loading direction in relation to the roll axle, the glide bearing elements are kept substantially stationary in relation to the roll axle in the principal loading direction.

The apparatus in accordance with the invention generally comprises at least one pair of glide bearing elements arranged on the roll axle for supporting the roll mantle in opposite radial directions substantially transverse to the principal loading direction and which act upon an inner face of the roll mantle under hydraulic pressure provided by a pressure medium. The glide bearing elements comprise guiding means for guiding movement of the roll mantle along a desired path, e.g., a substantially linear path in the principal loading direction. A regulation device is coupled to the glide bearing elements for distributing the pressure medium thereto and comprises a valve including a slide member having a spring connected thereto and a spindle coupled to the spring. One of the glide bearing elements has a guide face for controlling movement of the slide member whereby the spindle is supported against and engages the guide face by a force provided by the spring. The guide face may be formed on a projection extending into a cavity space of the glide bearing element and contacts a tip of the spindle.

Further advantages and characteristic features of the invention come out from the following detailed description of the invention.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
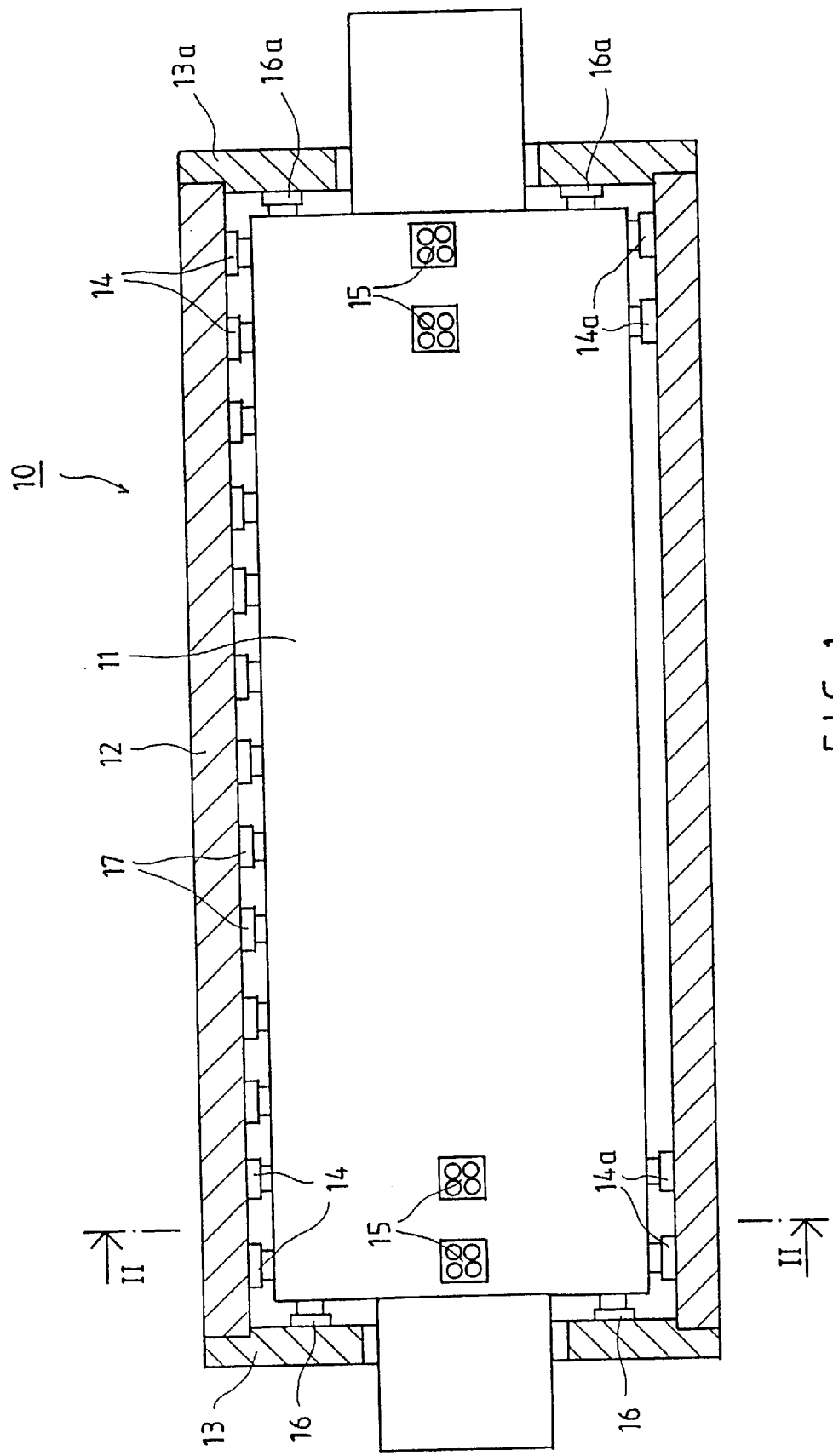
FIG. 1 is a schematic sectional side view of a roll with glide bearings in accordance with the invention, which roll is a variable-crown roll.
Figure 2:
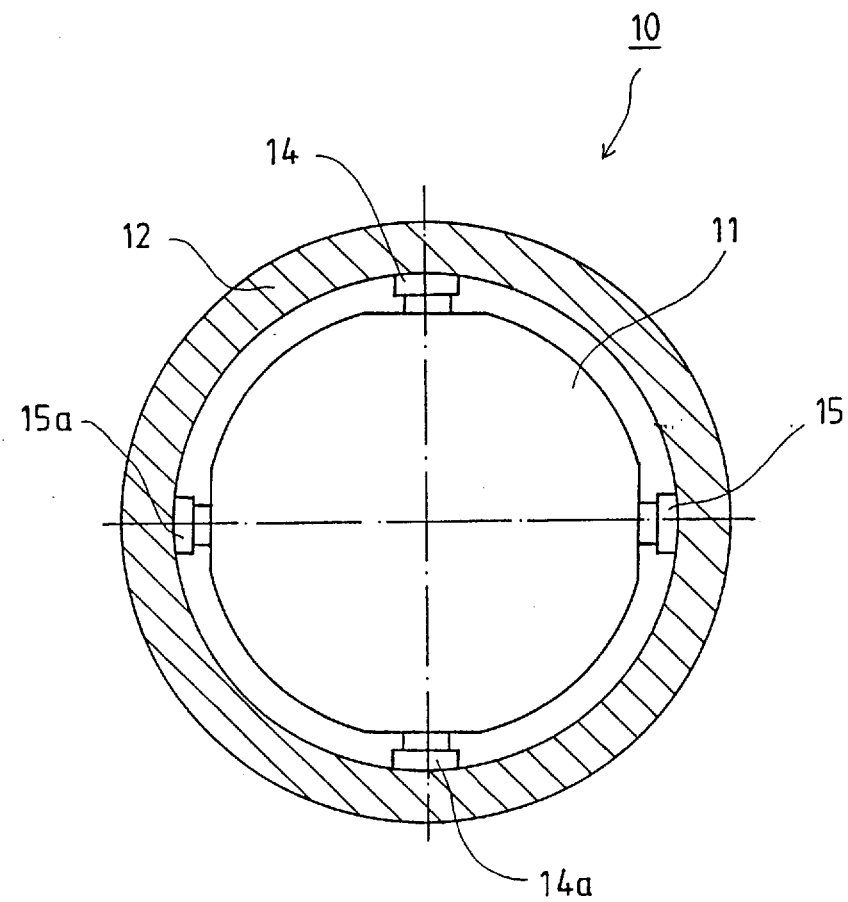
FIG. 2 is a schematic sectional view taken along the line II—II in FIG. 1.

Referring to the accompanying drawings wherein the same reference numerals refer to the same or similar elements, FIGS. 1 and 2 are sectional views of a tubular roll fitted with glide bearings in accordance with the invention so that FIG. 1 is an axial sectional view in the vertical plane of the roll, and FIG. 2 is a sectional view of the roll as shown in FIG. 1, taken along the line II—II. In FIGS. 1 and 2, the roll is denoted generally by reference numeral 10, and in these illustrated embodiments the roll 10 is a variable-crown roll, which comprises a stationary roll axle 11, on which the roll mantle 12 is fitted to revolve or rotate. The roll mantle is supported on the roll axle by means of hydraulic loading members 17 extending along substantially the entire axial length of the roll. The hydraulic loading members 17 are effective in the direction of the nip plane (defined as the plane between the center of roll 10 and the center of the roll with which it forms the nip, and by their means, it is possible to adjust the shape of the roll mantle 12 and control the nip profile of the roll in the axial direction of the roll as desired.

The roll 10 as shown in FIGS. 1 and 2 is a roll provided exclusively with glide bearings, so that the roll 10 does not have any conventional roller bearings fitted at the roll ends. The journalling of the roll 10 is accomplished by means of glide bearing elements, of which elements, the glide bearing elements that are effective in the direction of loading, i.e., in the direction of the nip plane in the case of the roll as shown in FIGS. 1 and 2, are denoted by reference numerals 14 and 14a. The first glide bearing elements 14 are effective in the direction of the nip formed at the top of the roll 10, i.e., against the loading in the so-called main loading direction, and the second glide bearing elements 14a are effective in the opposite direction. In the exemplifying embodiment shown in FIGS. 1 and 2, it is shown further that the roll 10 is also provided with glide bearing elements 15,15a effective in the direction transverse to the loading direction. There are at least one pair of glide bearing elements 14,14a,15,15a arranged in connection with the roll Elements 15,15a are similarly effective in opposite radial directions. Of course, conventional roller bearings can be used if desired.

Since the roll 10, as illustrated, is fitted exclusively with glide bearings, it may also be provided with at least one pair of glide bearing elements 16,16a effective in the axial direction of the roll and similarly in opposite directions. Elements 16,16a are supported by the intermediate of a fluid film against the roll ends 13,13a, respectively. As shown in FIGS. 1 and 2, the glide bearing elements 14,15,14a,15a effective in the radial direction are supported against the inner face of the roll mantle 12 by the intermediate of a fluid film. In the illustrated embodiment shown in FIG. 1, the glide bearing elements 14,14a,15,15a effective in the radial direction are arranged in pairs so that there are two pieces of each glide bearing element which are placed side by side in the axial direction. However, in view of the operation, such an arrangement is not an indispensable requirement since the journalling of the roll can also be accomplished by other means, for example, by means of single glide bearing elements alone or more than two such glide bearing elements.

In the illustrated embodiments shown in FIG. 2, the glide bearing elements 14 and 14a, 15 and 15a are arranged to act in the direction of loading of the nip and in the direction transverse to the nip-loading direction, respectively. However, there may also be a greater number of glide bearing elements, which are fitted to act radially in different angular positions. Regarding the axial glide-bearing elements, it can be stated further that, differing from FIG. 1, the axial movements of the roll mantle 12 can be controlled by means of just single glide bearing elements 16,16a alone, which are effective in the same plane in opposite directions. There may also be a greater number of such axial glide bearing elements 16,16a, which are, for example, uniformly spaced to act upon the inner faces of the roll ends 13,13a.

Figure 2A:
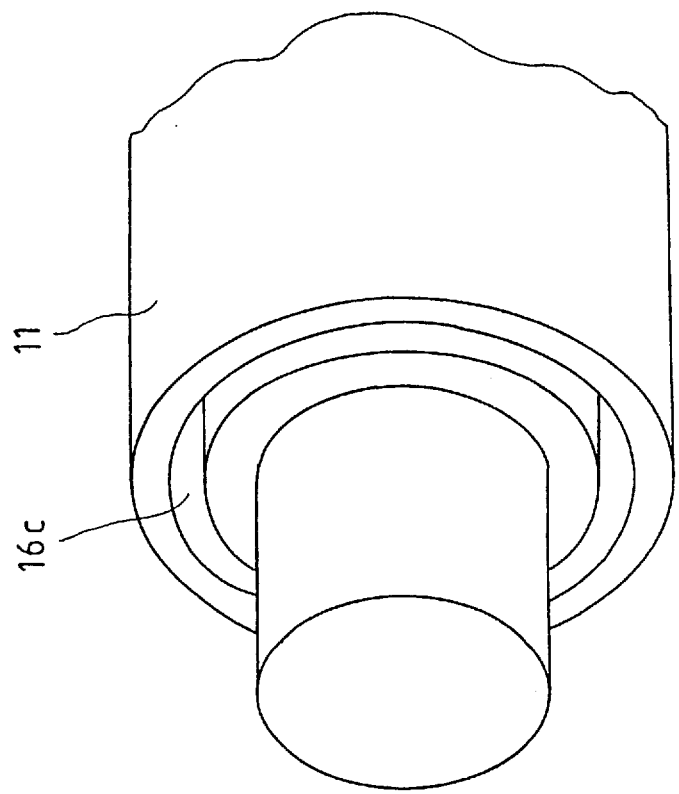
FIG. 2A is a schematic perspective view of an exemplifying embodiment of a preferred construction of the axial support.
Figure 2A:
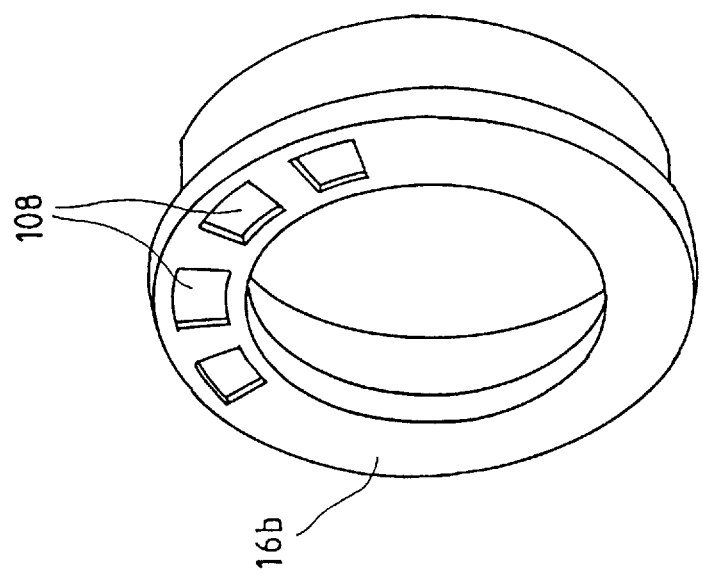

In FIG. 2A, a preferred embodiment of the axial glide bearing elements is shown. In this embodiment, axial glide bearing elements 16b are annular glide bearings having a support face which is supported against the roll end 13,13a. Fluid pockets or oil pockets 108 are formed in the support face. Similarly, an annular groove 16c is formed into the roll axle 11, in which the "piston art" of the glide bearing element 16b is fitted. The axial support can also be arranged so that glide-bearing elements 16b are supported against the same roll end 13 from opposite sides, in which case axial glide bearings are not needed at the opposite end of the roll.

Figure 3:
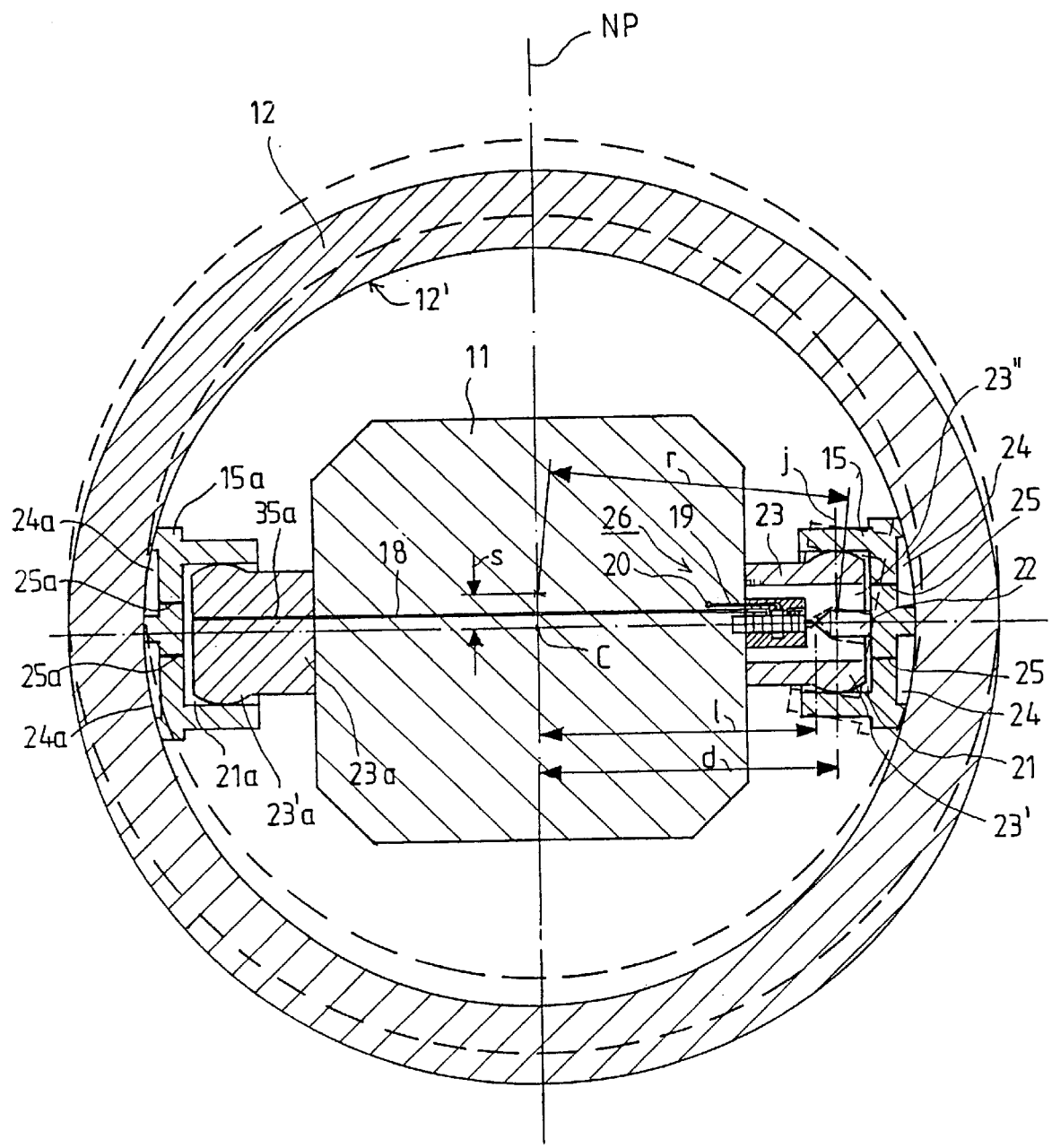
FIG. 3 is a schematic sectional view of an arrangement of support of the roll mantle in a roll provided with glide bearings.

FIG. 3 is a schematic sectional view of a first embodiment of the support arrangement of the roll mantle 12 in the direction transverse to the loading direction. As in FIGS. 1 and 2, in FIG. 3, the roll mantle is denoted by reference numeral 12 and the roll axle is denoted by reference numeral 11. The general construction of the arrangement used for lateral support of the roll mantle 12 will be described. As stated above, the roll mantle 12 is supported on the roll axle 11 by means of bearing elements 15,15a arranged in the direction transverse to the loading direction and acting in opposite directions. With regard to their operation, the glide bearing elements 15,15a are conventional, so that the glide bearing elements 15,15a are supported against an inner face 12' of the roll mantle by means of a fluid film. At least one portion of the glide bearing elements 15,15a may also engage with the inner surface 12'.

In the illustrated embodiment in FIG. 3, frame pieces 23,23a are mounted on the roll axle 11, which is not circular in this case, and the glide bearing elements 15,15a are provided with cavity spaces 21,21a that can be pressurized with a hydraulic pressure medium. The frame pieces 23,23a are arranged to penetrate into the cavity spaces 21,21a of the respective glide bearing elements 15,15a. The frame pieces 23,23a are sealed by means of seals against the peripheral surfaces or walls defining the cavity spaces 21,21a of the glide bearing elements 15,15a. Outer ends 23',23'a of the frame pieces 23,23a are shaped arcuate or spherical, in which case the spherical outer ends 23',23'a are supported against the cylindrical inner walls of the cavity spaces 21,21a of the glide bearing elements 15,15a by means of the seals and thereby form an articulated bearing on whose support the glide bearing elements 15,15a can pivot. In this manner, the glide bearing elements 15,15a are pivotally mounted on the roll axle. In FIG. 3, the distance of the journalling point of the articulated bearing from the nip plane NP is denoted by reference d, and the straight line passing through the journalling point, drawn with the dashed-dotted line, is denoted by reference j.

In a conventional manner, oil pockets 24,24a are formed in the outer faces of the glide bearing elements 15,15a and are in fluid communication with the cavity spaces 21,21a so that they can be pressurized through capillary bores 25,25a. Thus, pressure medium that is used for loading the glide bearing elements 15,15a passes; from the cavity spaces 21,21a through the capillary bores 25,25a into the oil pockets 24,24a to form a fluid film between the glide bearing elements 15,15a and the inner face 12' of the roll mantle.

The pressure medium that is used for loading the glide bearing elements 15,15a is passed into the roll along a central duct 20 through the roll axle, from which it is passed to the glide bearing elements 15,15a through a feed duct 19. The feed duct 19 does not communicate directly with the glide bearing elements 15,15a, but rather the roll is provided with a regulation device 26 which distributes the pressure medium to the glide bearing elements 15,15a, e.g., in accordance with or as a function of the movement of the roll mantle.

The frame piece 23 of the first glide bearing element 15 is hollow and comprises a cavity 23" in which the regulation device 26 is arranged. From this regulation device 26, the pressure medium is passed into the cavity space 21 of the first glide bearing element 15 along a pressure duct 35 and into the cavity space 21*a* of the second glide bearing element 15*a* along a connecting duct 18 and along a pressure duct 35*a* formed into the frame piece 23*a* of the second glide bearing element 15*a*.

Figure 4:
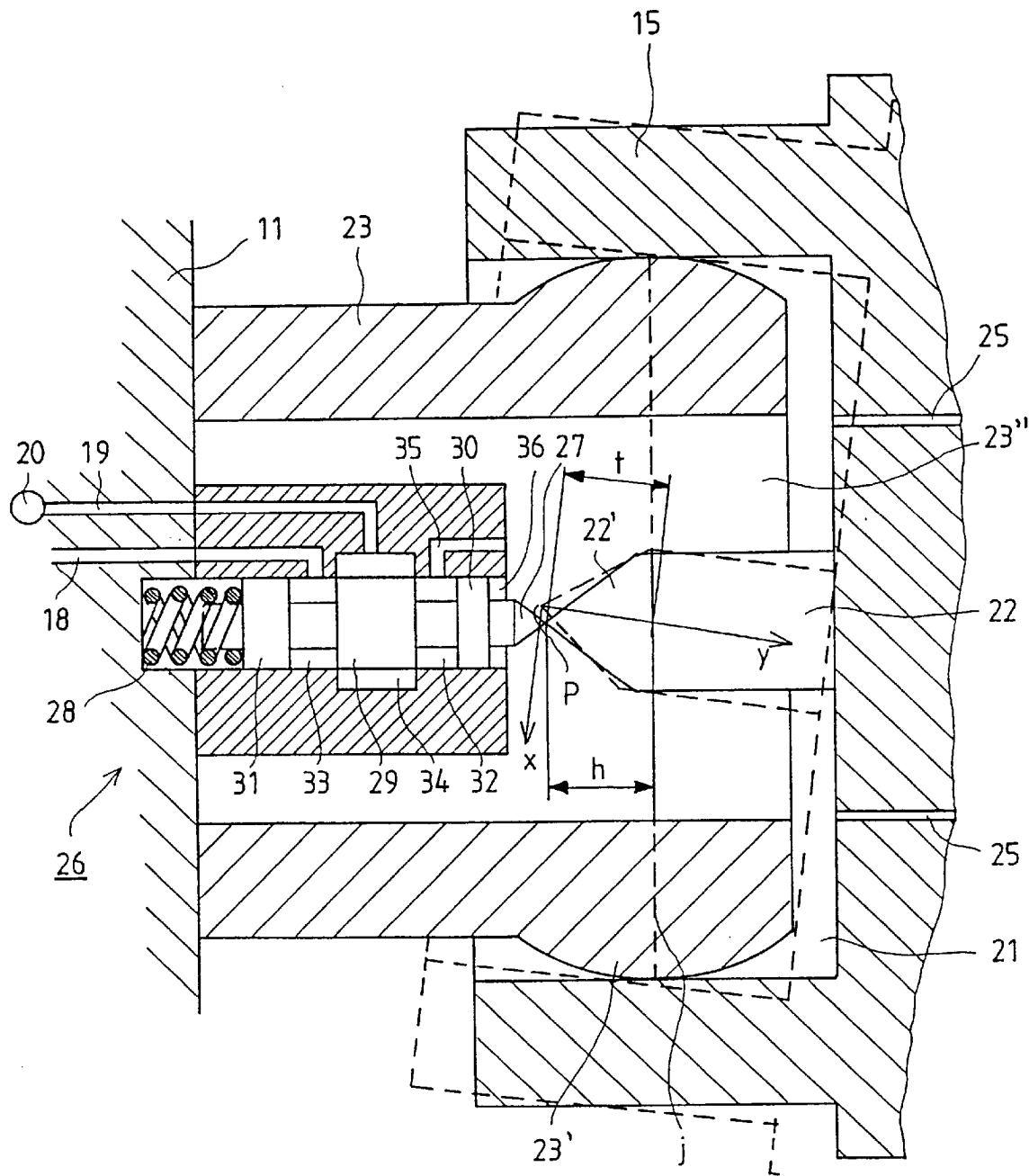
FIG. 4 is a more detailed illustration of the embodiment of support arrangement as shown in FIG. 3.

The first embodiment of the method and the device in accordance with the invention is illustrated in more detail in FIG. 4 in the drawing, which shows a more detailed portion of FIG. 3. First, with reference to FIGS. 3 and 4, it can be stated that, in FIG. 3, the dashed lines show the roll mantle 12 as shifted in the direction of the nip plane NP over the distances from the basic or central or normal position indicated by solid lines. When the roll mantle 12 moves in the manner indicated in FIG. 3, the glide bearing elements 15,15*a*, while following the inner face 121 of the roll mantle, pivot around their articulation points. This is also illustrated by dashed lines in respect of the first glide bearing element 15 in FIGS. 3 and 4.

As already stated earlier, the regulation device 26 is arranged in the cavity 23" in the frame piece 23 of the first glide bearing element 15, which regulation device 26 distributes the pressure medium to both of the glide bearing elements 15,15*a* acting in the lateral direction. The regulation device 26 comprises a valve including a three-part slide 29,30,31 arranged in a bore 36 formed into the frame of the valve. The middle part 29 of the slide, the first end part 30 of the slide, and the second end part 31 of the slide are coupled to one another through a spindle 27. The slide parts 29,30,31 are placed at a distance from one another so that, between each adjacent pair of slide parts, flow passages 32,33 remain for the pressure medium, i.e., flow passage 32 is formed between parts 29 and 30 and flow passage 33 is formed between parts 29 and 31. The first flow passage 32 communicates through the pressure duct 35 with the cavity space 21 of the first glide bearing element 15, and similarly the second flow passage 33 communicates through the connecting duct 18 and through the pressure duct 35*a* formed into the frame piece 23*a* of the second glide bearing element 15*a*, with the cavity space 21*a* of the second glide bearing element 15*a*. Behind the three-part slide 29,30,31 of the regulation-device 26, on the bottom of the bore 36, a spring 28 is installed to load the slide 29,30,31 toward the glide bearing element 15. The end of the spindle 27 that is directed towards the glide bearing element 15 is shaped conical as shown in FIG. 4.

A projection 22 is formed on a surface of the glide bearing element 15 which is directed inwards into its cavity space 21 and has an end face 22' resting against the tip of the conical end of the spindle 27. The pressure medium is passed to the regulation device 26 from the central duct 20 along the feed duct 19, and at the feed duct 19, an annular groove 34 is formed into the bore 36 through which the pressure medium has access in the desired manner through the first and/or second flow passage 32,33 into the cavity space 21,21*a* of the first and/or the second glide bearing element.

As stated above, by means of the regulation device 26, the lateral forces applied to the roll are compensated for, at least those force components in a direction of support of the glide bearing elements. The regulation device 26 is operated so that, through it, the pressure of the pressure medium is passed to both glide bearing elements 15,15*a* so that a higher pressure is passed to the side of the load to shift the roll mantle 12 against an externally applied load. When FIG. 3 is examined, it can be seen that, if an external load is applied against the direction of loading of the first glide bearing element 15, the three-part slide 29,30,31 is pushed, in FIG. 4, against the force of the spring 28 to the left, opening the first flow passage 32 and closing the second flow passage 33. Then, the pressure of the pressure medium coming from the feed duct 19 is passed through the first flow passage 32 and through the pressure duct 35 into the cavity space 21 of the first glide bearing element 15. At the same time, the middle part of the slide prevents access of the pressure into the cavity space 21*a* of the second glide bearing element 15*a*. Thus, a higher pressure passes into the cavity space 21 of the first glide bearing element 15, whereby the pressure corrects the position of the mantle to the correct operating position.

The construction of the regulation device 26 is such that even a very small movement of the roll mantle 12 controls the flow and the pressure in the desired manner. According to FIG. 4, this has been accomplished in a simple way so that the axial length of the middle part 29 of the slide is substantially equal to, or slightly shorter than, the axial length of the annular groove 34 formed into the bore 36. Since the length of the middle part 29 of the slide is substantially equal to the axial length of the annular groove 34 formed into the bore 36, for example, by means of the shape of the middle part 29 of the slide, it is achieved that, in the middle position shown, oil has access to both of the glide bearing elements 15,15*a* in a standard operating position. Immediately when the slide 29,30,31 is shifted away from the middle position shown in FIG. 4, the flow passage is opened into one of the cavity spaces 21,21*a*, at the same time as the flow into the opposite cavity space is closed. Thus, the regulation device 26 reacts immediately and without delay to movements of the roll mantle 12.

One of the objects of the invention is to provide a solution with which the roll mantle 12 moves in the direction of the nip plane NP along a linear path irrespective of the position of the roll axle 11. This has been achieved by means of a contact in accordance with the invention between the valve spindle 27 of the regulation device 26 and the first glide bearing element 15 (more particularly, end face 22' of the projection 22), which contact has been arranged so that, when the roll mantle 12 moves, the glide bearing elements 15,15*a* do not move in the loading direction, i.e., in the direction of the nip plane NP, in relation to the roll axle 11, but they exclusively pivot in relation to their articulation points. It is a problem in carrying out the linear movement how the glide bearing element 15 can sense in what way it must position itself in relation to the roll mantle 12. In the first embodiment of the invention as shown in FIG. 4 this has been accomplished as follows.

It is a principal idea in the embodiment of FIG. 4 that the support face formed on the glide bearing element 15 and that is supported against the conical tip of the valve spindle 27 of the regulation device 26, i.e., the end face 22' of the projection 22, is shaped so that the glide bearing elements 15,15*a* are positioned in the desired manner in relation to the roll mantle 12. In more detail, by means of a geometric examination, the shape of the end face 22' of the projection 22 can be defined and determined such that the movement of the glide bearing element 15 takes place in the desired manner along a desired path. According to FIG. 4, when the movement of the point P fixed to the valve spindle 27 of the regulation device 26 (to the conical tip of the spindle 27) in the system of XY-coordinates fixed to the glide bearing element 15 (to the support face 22' of the projection 22) is examined, in which system of coordinates the Y-axis is directed perpendicularly to the plane bottom of the cavity space 21 of the glide bearing element 15 and the X-axis is perpendicular to the direction, the equations that follow later can be presented so as to determine the shape of the support face 22' of the projection 22, i.e., the shape of the guiding face.

In FIGS. 3 and 4, a situation is examined in which the roll mantle 12 moves in a linear direction over the distance s in the direction of the nip plane NP. When the movement s is 0, the point P fixed to the spindle 27 is in the origin of the system of XY-coordinates. Of the denotations used in FIG. 3, the denotation 1 means the perpendicular distance of the point P from the nip plane NP, the reference d, as already stated above, denotes the perpendicular distance of the straight line i, i.e., of the journalling point between the first glide bearing element 15 and the frame piece 23, from the nip plane NP, and the reference r denotes the distance of the center point of the journalling between the first glide bearing shoe 15 and the frame piece 23 from the center point of the roll mantle 12. In a corresponding manner, concerning the denotations used in FIG. 4, it can be stated that the reference h denotes the distance perpendicular to the nip plane NP of the point P from the straight line j passing through the articulation point between the first glide bearing element 15 and the frame piece 23. Also, the reference t denotes the distance of the point P from the center point of the articulation between the first glide bearing element and the frame piece 23 as directed at the center point of the roll mantle 12 when the roll mantle 12 has been shifted over the distance s in the direction of the nip plane NP. Then, when using the denotations of FIGS. 3 and 4 and based on the geometry, the following formulas (1) and (2) are obtained:

$$s/r = x/h \quad (1)$$

$$t/h = d/r \quad (2)$$

On the other hand, from the condition of location in the system of coordinates, the equation (3) is obtained:

$$y = r - 1 - t \quad (3)$$

From a geometric examination of FIG. 3, the equation (4) is obtained:

$$r = (s^2 + d^2)^{1/2} \quad (4)$$

The X-coordinate of the point P is now obtained as a function of s by placing the equation (4) in the equation (1), whereby the equation (5) is obtained:

$$x = \frac{s \cdot h}{\sqrt{s^2 + d^2}} \quad (5)$$

In a corresponding manner, the Y-coordinate of the point P can be solved by making use of the equations (2), (3), (4), whereby the equation (6) is obtained, which presents the Y-coordinate of the point P as a function of s:

$$y = \sqrt{s^2 + d^2} - l - \frac{d \cdot h}{\sqrt{s^2 + d^2}} \quad (6)$$

Now, from the equations (5) and (6), it is possible to solve the equation of the curve in which Y is given as a function of X. Then the equation is:

$$y = \frac{d \, h}{\sqrt{h^2 - x^2}} - l - \sqrt{h^2 - x^2} \quad (7)$$

Thus, this curve in accordance with the equation (7) represents the shape of the support face 22' of the projection 22, i.e., the shape of the guiding face with which, in the embodiment of FIG. 4, a linear movement in the direction of the nip plane NP can be provided for the roll mantle 12.

Figure 5:
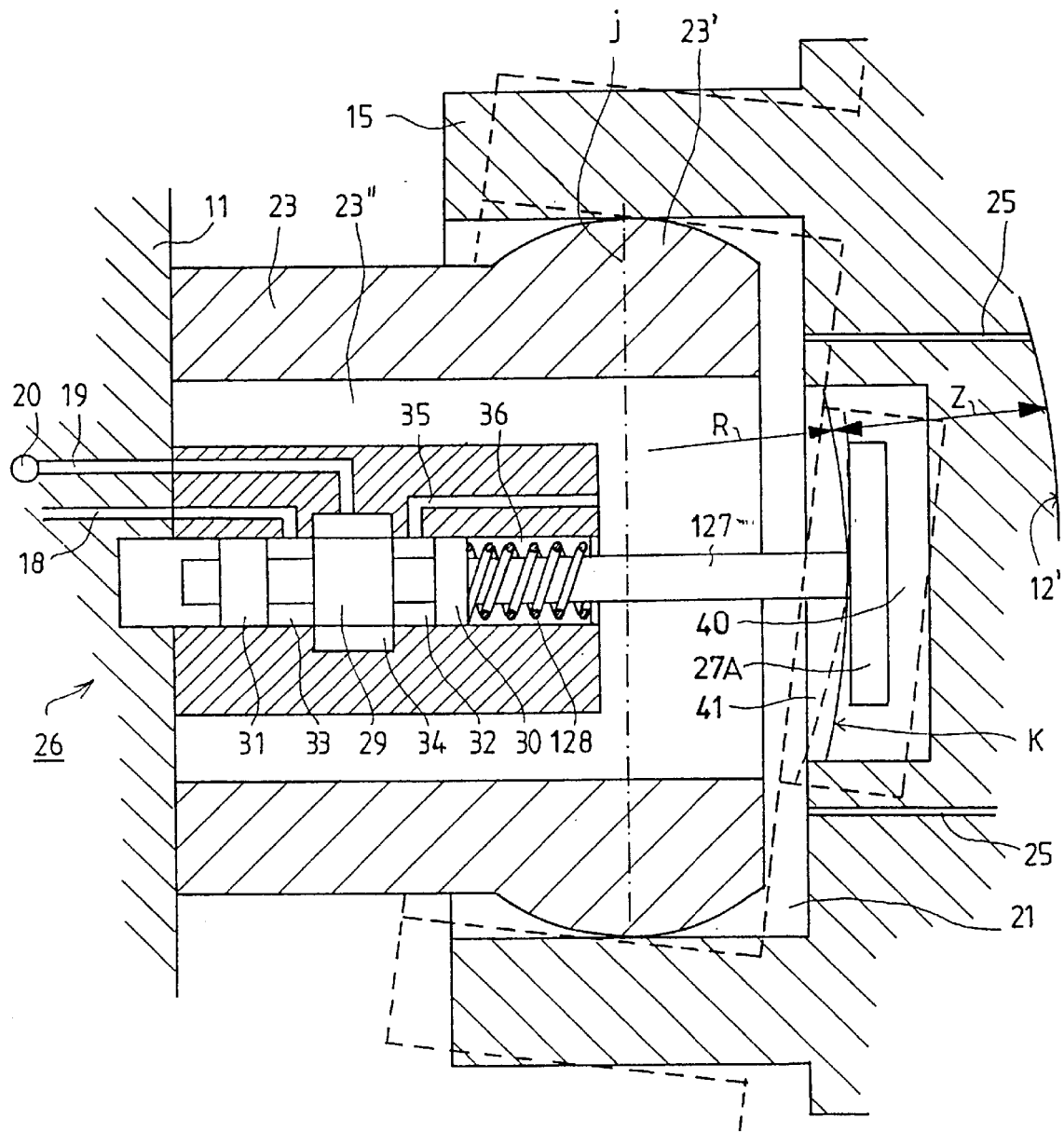
FIG. 5 shows an embodiment alternative to the arrangement shown in FIG. 4.
Figure 6:
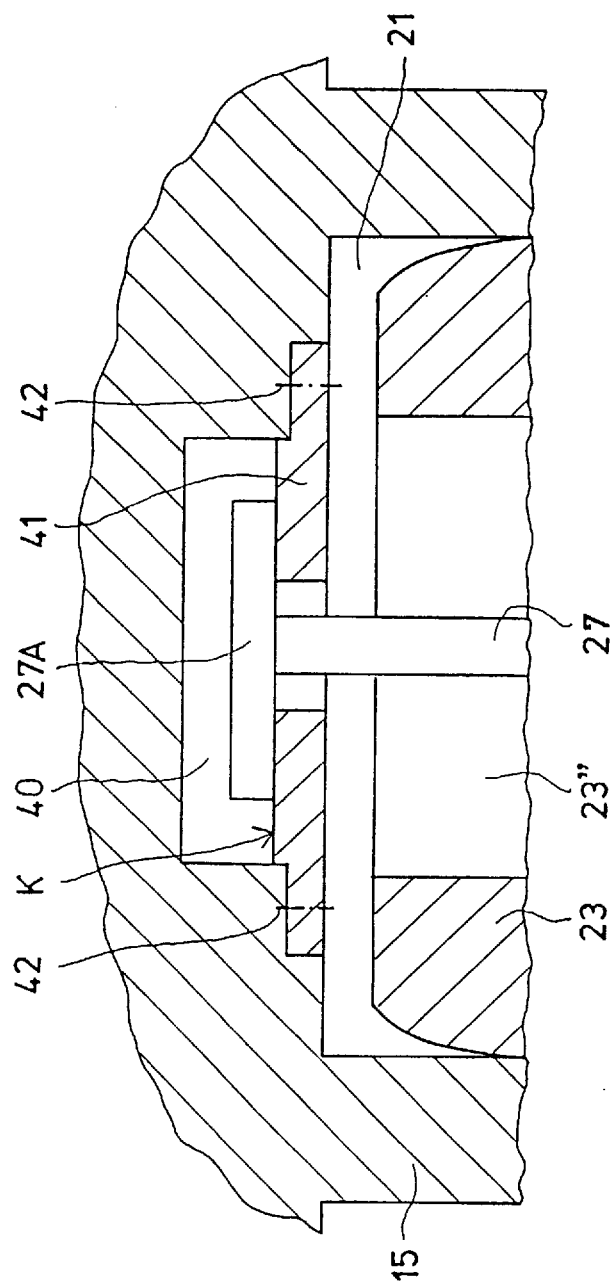
FIG. 6 is a sectional view taken along the line VI—VI in FIG. 5.

FIGS. 5 and 6 show a second embodiment of the invention. The illustration in FIG. 5 corresponds to FIG. 4, and FIG. 6 is a schematic partial sectional view taken along the line VI—VI in FIG. 5. Thus, also in the embodiment of FIGS. 5 and 6, the roll mantle 12 is supported on the roll axle 11 by means of bearing elements 15,15a arranged in the direction transverse to the loading direction and which act in opposite directions. The bearing elements 15,15a are supported in the conventional manner by means of a fluid film against the inner face 12' of the roll mantle. The illustration in FIG. 5 is similar to the illustration in FIG. 4, so that the frame pieces 23,23a are mounted on the roll axle 11, and the glide bearing elements 15,15a are provided with cavity spaces 21,21a that can be pressurized by means of a hydraulic pressure medium. The frame pieces 23,23a are arranged to penetrate into the cavity spaces and are sealed by means of seals against the cavity spaces 21,21a of the glide bearing elements 15,15a.

Also in this embodiment, the outer ends 23',23'a of the frame pieces 23,23a are shaped spherical, in which case the spherical outer ends 23',23'a are supported by means of a seal against the cylindrical inner walls of the cavity spaces 21,21a of the glide bearing elements 15,15a and form an articulated bearing on whose support the glide bearing element 15,15a can pivot. The straight line passing through the journalling point of the articulated bearing is drawn with a dashed-dotted line and denoted by the reference j. The distance of this journalling point from the nip plane NP is denoted by the reference d, as indicated in FIG. 3. In the manner described above, oil pockets 24,24a are formed onto the outer faces of the glide bearing elements 15,15a, which pockets communicate through capillary bores 25,25a with the pressurized cavity spaces 21,21a. Pressure medium that is used for loading the glide bearing elements 15,15a is transferred from the cavity spaces 21,21a through the capillary bores 25,25a into the oil pockets so as to form a fluid film between the glide bearing elements 15,15a and the inner face 12' of the roll mantle. The pressure medium is passed to the glide bearing elements 15,15a along the central duct 20, from which it is passed to the glide bearing elements 15,15a through the feed duct 19.

The distribution of the pressure medium to the glide bearing elements 15, 15a acting in opposite direction is arranged by means of a regulation device 26 arranged in the cavity 23" in the hollow frame piece 23 of the first glide bearing element 15. The regulation device 26 distributes the pressure medium to the glide bearing elements 15,15a so that the pressure medium is passed into the cavity space 21 of the first glide bearing element 15 along the pressure duct 35 and into the cavity space 21a of the second glide bearing element 15a through a connecting duct 18 formed into the roll axle 11 and through a pressure duct 35a formed into the frame piece 23a of the second glide bearing element 15a. The regulation device 26 comprises a valve similar to that described in connection with FIG. 4, so that a bore 36 is formed into the frame of the regulation device 26, into which bore a three-part slide 29,30,31 is placed. The parts of the slide are connected with one another by means of a spindle 127 so that flow passages 32,33 remain between the slide parts for the pressure medium. The annular groove shown at the feed duct 19 is denoted by the reference numeral 34 also in FIG. 5.

The embodiment of FIG. 5 differs from that of FIG. 4 as follows. In the illustration in FIG. 5, a spring 128 which loads the slide of the regulation device 26 is arranged in the bore 36 behind the first end part 30 of the slide to load the slide in the radial direction of the roll inwards (whereas in FIG. 4, the spring 28 is in an opposite orientation). A recess 40 is formed in the bottom of the cavity space 21 of the glide bearing element 15. A support piece 41 is attached into this recess 40, as shown most clearly in FIG. 6, by means of fastening screws 42 or equivalent fastening means so that a free space remains in the recess 40 underneath the support piece 41. Onto the support piece 41, a support face K is formed that is directed outward in the direction of the radius. A spindle 127 of the regulation device 26 is extended so that the spindle 127 penetrates into the recess 410 formed into the glide bearing element 15. At the outer end of the spindle 127, a plate 27A, disk or equivalent is fitted, which is transverse to the longitudinal direction of the spindle 127. The plate 27A is supported against the support face K while loaded by the spring 128. The support face K is curved and shaped as an arc of a circle, the center point of its radius R being placed in the center point of the roll mantle 12. The distance Z of the curved support face K in the direction of the radius from the inner face 12' of the roll mantle is substantially constant, the contact point between the plate 27A and the support face K being always at the constant distance Z from the inner face 12' of the roll mantle. For this reason, when the roll mantle 12 moves, for example, through the distance s shown in FIG. 3, the movement of shifting takes place along a linear path in the direction of the nip plane NP because the curve radius R of the support face K and the distance Z of the support face from the inner face 12' of the roll mantle are invariable in the manner described above. Thus, when the roll mantle 12 is shifted in the direction of the nip plane NP, the regulation device 26 does not attempt to correct the location and position of the roll mantle 12 in an incorrect way.

In a preferred embodiment of the arrangement shown in FIG. 5, the distance Z of the support face K from the inner face 12' of the roll mantle is made large enough so that the support face K is placed on the straight line j. In this embodiment, when the roll mantle 12 moves, no gliding movement takes place at the contact point between the support face K and the plate 27A, but the contact point moves rolling along the support face K. Thus, there is no function at all that might possibly disturb the operation.

In FIGS. 4 and 5, precise and detailed examples were given of preferred embodiments of the invention. As regards these examples, it should, however, be ascertained that, in the embodiment of FIG. 4, it is essential that a face that presses the spindle 27 of the regulation device 26 has been machined or formed in some other way onto the glide bearing element 15, the face being shaped so that when the roll mantle 12 is shifted, this shifting movement takes place along a linear path.

Similarly, it is essential in the embodiment of FIG. 5 that a face that pulls the spindle 127 of the regulation device 26 has been machined or formed in an equivalent way onto the glide bearing element 15, the shape of the face being already described above.

The examples provided above are not meant to be exclusive. Many other variations of the present invention would be obvious to those skilled in the art, and are contemplated to be within the scope of the appended claims.

I claim:

1. A method for rotatingly supporting a roll mantle on a stationary roll axle in a paper machine, wherein loading means are arranged on said roll axle for supporting and loading said roll mantle in a principal loading direction, said roll mantle being movable in relation to said roll axle at least in the principal loading direction, comprising the step of:

arranging at least one pair of glide bearing elements to support said roll mantle in opposite radial directions substantially transverse to the principal loading direction, said at least one pair of glide bearing elements acting upon said roll mantle under hydraulic pressure provided by a pressure medium, and guiding the movement of said roll mantle along a desired path upon movement of said roll mantle in the principal loading direction.

2. The method of claim 1, wherein said movement guiding step comprises the step of:

guiding the movement of said roll mantle along a substantially linear path in the principal loading direction.

3. The method of claim 1, further comprising the step of:

regulating the flow and the pressure of the pressure medium to each of said at least one pair of glide bearing elements relative to the movement of said roll mantle.

4. The method of claim 3, wherein the pressure medium flow and pressure regulating step comprises the steps of:

supplying pressure medium to a valve having a first outlet leading to a first one of said at least one pair of glide bearing elements and a second outlet leading to a second one of said at least one pair of glide bearing elements, arranging a movable slide in said valve to selectively control opening and closing of said first and second outlets relative to one another, and coupling said slide to said first one of said at least one pair of glide bearing elements to control movement of said slide relative to the movement of said roll mantle as conveyed through the movement of said first one of said at least one pair of glide bearing elements.

5. The method of claim 1, further comprising the step of:

guiding said at least one pair of glide bearing elements as a function of the movement of said roll mantle such that, when said roll mantle is moved in the principal loading direction in relation to said roll axle, said at least one pair of glide bearing elements are kept substantially stationary in relation to said roll axle in the principal loading direction.

\* \* \* \* \*